United States Patent
Zhang et al.

(10) Patent No.: US 9,705,965 B2
(45) Date of Patent: Jul. 11, 2017

(54) SYSTEMS AND METHODS FOR PAAS LEVEL APP MOTION

(71) Applicant: VMware, Inc., Palo Alto, CA (US)

(72) Inventors: Haining Henry Zhang, Beijing (CN); Figo Feng, Shanghai (CN); Cheng Dan, Beijing (CN)

(73) Assignee: VMware, Inc., Palo Alto, CA (US)

( * ) Notice: Subject to any disclaimer, the term of this patent is extended or adjusted under 35 U.S.C. 154(b) by 518 days.

(21) Appl. No.: 13/967,279

(22) Filed: Aug. 14, 2013

(65) Prior Publication Data

US 2015/0052218 A1  Feb. 19, 2015

(51) Int. Cl.
*G06F 15/16* (2006.01)
*H04L 29/08* (2006.01)
*G06F 9/48* (2006.01)

(52) U.S. Cl.
CPC ........... *H04L 67/10* (2013.01); *G06F 9/4856* (2013.01)

(58) Field of Classification Search
CPC ....... H04L 47/78; H04L 67/10; G06F 9/5077; G06F 9/4856
USPC ......................................................... 709/217
See application file for complete search history.

(56) References Cited

U.S. PATENT DOCUMENTS

| | | | | |
|---|---|---|---|---|
| 2011/0137805 A1* | 6/2011 | Brookbanks | .......... | G06F 9/5072 705/80 |
| 2011/0265164 A1* | 10/2011 | Lucovsky | ........... | G06F 9/45533 726/7 |
| 2011/0265168 A1* | 10/2011 | Lucovsky | ........... | H04L 63/0245 726/7 |
| 2012/0030672 A1* | 2/2012 | Zygmuntowicz | ......... | G06F 8/60 718/1 |
| 2012/0072555 A1* | 3/2012 | DeLuca | .................. | H04L 47/78 709/220 |
| 2013/0204849 A1* | 8/2013 | Chacko | ................. | G06F 3/0604 707/692 |
| 2013/0268861 A1* | 10/2013 | Bailey | ................... | G06F 9/5072 715/735 |
| 2014/0130036 A1* | 5/2014 | Gurikar | ..................... | G06F 8/61 717/176 |
| 2014/0156813 A1* | 6/2014 | Zheng | ..................... | H04L 67/16 709/220 |
| 2015/0007197 A1* | 1/2015 | Tripp | ........................ | G06F 9/44 718/106 |

* cited by examiner

*Primary Examiner* — June Sison
*Assistant Examiner* — Dixon Dabipi

(57) ABSTRACT

Systems and methods described herein presents a PaaS level application or app motion system that manages and moves applications between multiple PaaS instances in a hybrid cloud that includes both private and public cloud instances. Specifically, the system performs an app motion operation on an application by cloning, moving, and/or scaling up the application from one PaaS instance to one or more other PaaS instances in the hybrid cloud. Since the system achieves application mobility and scalability at the PaaS level by only moving the application and its associated data between the PaaS instances without moving the virtual machines (VMs), it could greatly reduce the amount of data transmitted during the process and save both time and network resources. It also enables enterprises to extend their applications from a private cloud to a public cloud and uniformly manage the applications cross the boundaries of the clouds.

22 Claims, 3 Drawing Sheets

SYSTEMS AND METHODS FOR PAAS LEVEL APP MOTION

BACKGROUND

Cloud computing has three typical service models/layers: Software as a Service (SaaS), Infrastructure as a Service (IaaS), and Platform as a Service (PaaS). SaaS offers applications to end users directly through network. IaaS offers infrastructure resources such as virtual machines, storage and network. PaaS provides a platform that contains application runtime environments (e.g. Java JRE) and related services (e.g. MySQL) such as database and middleware, wherein developers can deploy and run their applications on the platform directly, which greatly reduces the cost and time of managing complex software and hardware. The PaaS layer is often built on top of IaaS layer to take advantage of the infrastructure provisioning services offered by the IaaS layer. The PaaS layer usually consumes a large amount of resources from the IaaS layer including virtual machines (VMs), networks and storage.

In terms of deployment model, cloud computing utilizes three basic types of cloud: private cloud, public cloud and hybrid cloud. A private cloud is cloud infrastructure operated only for a single organization. A private cloud can be on-premise or hosted externally by a third-party vendor. The latter is often referred as a virtual private cloud (VPC). A public cloud's resources are generally available to the general public and users share the infrastructure. A hybrid cloud is a combination of private and public clouds, which allows enterprises to extend their private, on-premises clouds into the public cloud. Regardless of the deployment model chosen, an enterprise may choose to use hybrid cloud instances for at least the following reasons. First, geographically distributed cloud instances can support location-based applications. Second, hybrid cloud instances can be used to implement a disaster recovery (DR) solution. Third, workloads can be moved or cloned between clouds for load balancing or maintenance purposes. Consequently, it has become more and more important for enterprises to manage and distribute workloads in a hybrid cloud environment.

As more and more vendors offer public PaaS services, there is a growing need for enterprises to manage their applications in a hybrid cloud that includes both private and public cloud instances. In such a hybrid cloud environment, it is important for the enterprise to scale out its on-premise applications to public PaaS instances. In general, the hybrid cloud requirements include application migration or cloning, geographic load-balancing, and disaster recovery (DR). Existing products address the need of the hybrid cloud at the IaaS layer. However, little has been done for the hybrid cloud at the PaaS layer. Although the hybrid cloud requirements for PaaS can be fulfilled by the IaaS-based products in theory, it is not efficient in practice to manage PaaS instances in the hybrid cloud via an IaaS approach. For a non-limiting example, in order to move an application from one PaaS instance to another, an IaaS solution would need to move all virtual machines (VMs) running on the source instance to the destination IaaS infrastructure. Since a typical PaaS instance may contain hundreds or thousands of VMs, moving all of the VMs from one instance to another at the IaaS layer is both time consuming and cost inefficient.

SUMMARY

Systems and methods described herein present a PaaS level application or app motion system that manages and moves applications between multiple PaaS instances in a hybrid cloud that includes both private and public cloud instances. Specifically, the system moves or scales up an application from one PaaS instance to one or more other PaaS instances in the hybrid cloud by cloning, moving, and/or scaling up the application. Since the system achieves application mobility and scalability at the PaaS level by only moving the application and its associated data between the PaaS instances without moving the VMs, it could greatly reduce the amount of data transmitted during the process and saves both time and network resources. It also enables enterprises to extend their applications from a private cloud to a public cloud and uniformly manage the applications across the boundaries of the clouds.

DETAILED DESCRIPTION

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
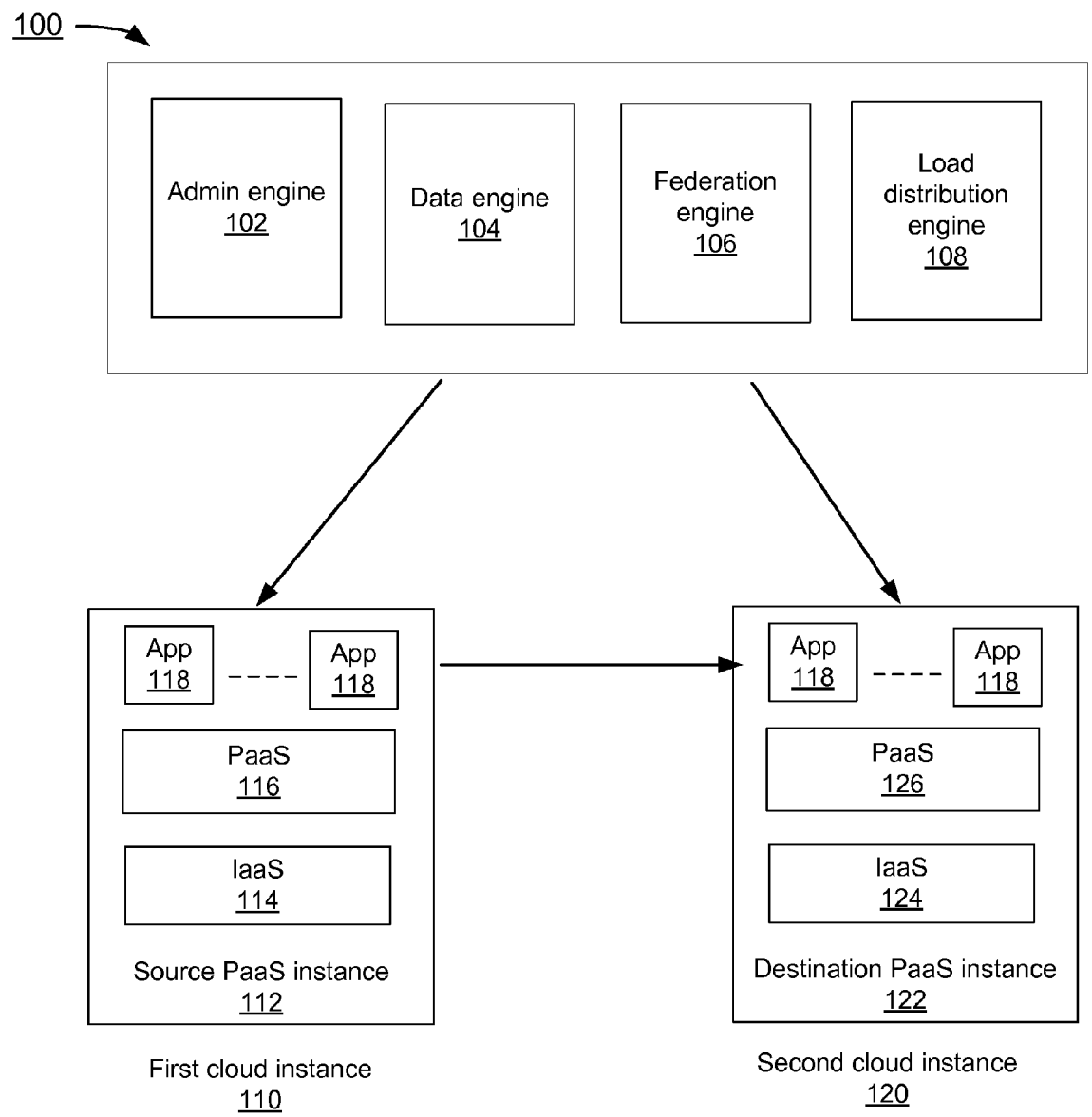
FIG. 1 shows an example of a system diagram to support PaaS level app motion in a hybrid cloud.

FIG. 1 shows an example of a system diagram to support PaaS level application (app) motion in a hybrid cloud. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least admin engine 102, data engine 104, federation engine 106, and load distribution engine 108. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

Each of the engines shown in FIG. 1 runs on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, a PDA, or a server machine. A storage device can be but is not limited to a hard disk drive, a flash memory drive, or any portable storage device. A communication device can be but is not limited to a mobile phone.

In the example of FIG. 1, each of the engines has a communication interface (not shown), which is a software component that enables the engines to communicate with each other and with other software/hardware over a network (not shown) following certain communication protocols, such as TCP/IP protocol. The network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

As shown in the example of FIG. 1, source PaaS instance 112 and destination PaaS instance 122 are running on hosts located in source cloud instance 110 and destination cloud instance 120, respectively. Each PaaS instance (112 or 122) includes a PaaS level/layer (116 or 126), wherein the PaaS layer is built on top of an IaaS layer (114 or 124) and provides runtimes and services to applications 118 directly deployed on the PaaS layer. Here, source PaaS instance 112 and destination PaaS instance 122 can be heterogeneous, e.g., one being Cloud Foundry and the other being OpenShift, as long as each of the PaaS instances provides an application management application programming interface (API) to system 100. Each of the cloud instances 110 and 120 can be either in a private cloud operated only within an organization in an internal data center or in a public cloud generally at a public data center that is accessible by the public. Note that although a single destination PaaS instance 122 is used as a non-limiting example in the discussions hereinafter, the same approaches for app motion also apply to the situation where there are a plurality of destination PaaS instances 122 in one or more destination cloud instances 120.

In the example of FIG. 1, admin engine 102 of system 100 enables an administrator to manage multiple PaaS instances such as 112 and 122 across multiple cloud instances such as 110 and 120. In some embodiments, admin engine 102 can be implemented as a web-based console that is accessible by the administrator via a web browser. In some embodiments, admin engine 102 provides an aggregated view of all of the PaaS instances running in the cloud to the administrator through a single or multiple panes of user interface (UI). Admin engine 102 further enables the administrator to select an app (e.g., 118) as well as a source PaaS instance (e.g., 112) and a destination PaaS instance (e.g., 122), wherein app 118 is to be moved, cloned, or scaled up from the source PaaS instance 112 to the destination PaaS instance 122 across one or more private and/or public cloud instances. As referred to hereinafter, moving, cloning (copying to a new app instance), or scaling up (copying to plurality of new app instances) an application from one PaaS instance to another is termed as an "app motion operation."

In the example of FIG. 1, data engine 104 of system 100 moves and/or copies data (e.g. data in a relational database) to be accessed by or associated with app 118, which is the subject of an app motion operation, from the source PaaS instance 112 to the destination PaaS instance 122. Although moving, cloning, or scaling an application across difference cloud instances may not always require data to be moved or copied as well (depending upon the use cases), many applications do require access to local data under most scenarios. As a result, data associated with an application should be properly copied or moved when the app itself is being moved, copied, or scaled up from one PaaS instance to another.

In some embodiments, data engine 104 moves or copies the data from one PaaS instance to another at various layers of the hosts/computer systems on which the PaaS instances are running. In some embodiments, data engine 104 moves or copies data from one PaaS instance to another at the hardware level by utilizing data replication features of storage devices of the hosts. In some embodiments, data engine 104 utilizes a hypervisor (e.g., vSphere) running on source PaaS instance 112 to replicate the image of a database VM (including the data) to another (remote) hypervisor running on destination PaaS instance 122. The term "hypervisor" refers to virtualization software running on a host for managing hardware resources and software components of the host for virtualizing or emulating physical devices to provide virtual devices, as a virtual machine (VM) to a user. In some embodiments, data engine 104 can also utilize an operating system of the host to replicate a file system from a local computer running source PaaS instance 112 to a remote computer running destination PaaS instance 122. Additionally, databases usually offer some kind of replication mechanisms between the two PaaS instances.

In the example of FIG. 1, federation engine 106 of system 100 performs an app motion operation on the designated app 118 by moving, cloning, or scaling it up at PaaS layer from source PaaS instance 112 in cloud instance 110 to destination PaaS instance 122 in cloud instance 120 by invoking application management API of the PaaS instances. In some embodiments, the designated app 118 may be moved, cloned, or scaled it up from source PaaS instance 112 to a plurality of destination PaaS instances 122 in one or more cloud instances 120. Following the app motion operation, multiple instances of app 118 may exist on the source PaaS instance 112 and the destination PaaS instance 122. Moving the application at the PaaS layer is more efficient than doing so at the IaaS layer since federation engine 106 only transfers bits (e.g. the WAR file of a Java app) of app 118 from the source PaaS instance 112 to the destination PaaS instance 122, while other elements required for running app 118, such as operating system, middleware, runtimes and services, do not need to be copied or moved from the source PaaS instance 112 because they are also available on destination PaaS instance 122. In contrast, if app 118 were to be moved using services from IaaS layer instead, federation engine 106 would also need to transfer all VMs running on the source PaaS instance 112 to the destination PaaS instance 122. Since a PaaS instance, such as Cloud Foundry, can scale up to thousands of VMs as needed, moving so many VMs at the IaaS layer instead of at the PaaS layer would be at a huge cost.

In some embodiments, federation engine 106 creates and manages a virtual federated identity of app 118 running on the PaaS instances by storing and aggregating metadata of app 118 on each of the PaaS instances. As used herein, the federated identity refers to the identity of an owner (developer) of app 118, wherein the app owner may use the federated identity to authenticate himself/herself to multiple PaaS instances so that once authenticated, he/she has the privilege to move apps across the PaaS instances without having to authenticate himself/herself repeatedly. For a non-limiting example, a developer may have an account id_A with PaaS instance A and an account id_B with PaaS instance B. When the owner of app 118 registers with federation engine 106 for the first time, federation engine

106 will ask the app owner to authenticate himself/herself against PaaS instances A and B, respectively. After authenticating to the PaaS instances, the developer will be issued access tokens (such as token_A and token_B) by each of the PaaS instances. Federation engine 106 then creates a virtual identity id_Fed for app 118 and associates both tokens of the PaaS instances token_A and token_B with the newly created virtual identity id_Fed. When the developer later wants to move app 118 from PaaS instance A to PaaS instance B, federation engine 106 will use the virtual identity id_Fed to perform app motion related activities by invoking APIs of either PaaS instance A or PaaS instance B using the stored tokens token_A and token_B associated with the virtual identity id_Fed. Through the virtual identity, federation engine 106 can in effect create a virtual (federated) layer on top of the multiple and possibly heterogeneous PaaS instances across multiple cloud instances on which a plurality of instances of app 118 are running, wherein any motion of the app instances across the cloud instances is transparent to the owner of app 118.

In some embodiments, each PaaS instance (112 or 122) may have a module for User Identity Management (UIM), which provides identity management functionalities for apps running on the PaaS instance. In some embodiments, federation engine 106 creates the virtual identity for app 118 and its instances running on the PaaS instances by invoking API of the UIM of the PaaS instances, wherein the virtual identity can be used by the owner of app 118 to access the application management API of each of the PaaS instances as discussed above.

In some embodiments, following an app motion operation from the source PaaS instance 112 to destination PaaS instance 122, multiple instances of app 118 may have been created. Under such scenario, load distribution engine 108 as shown in the example of FIG. 1 adjusts the load distribution across the PaaS instances by determining which instance of app 118 should serve a particular request made to the app by a client. Specifically, load distribution engine 108 may adopt one of the following load distribution approaches:

(1) DNS rotation. In some embodiments, all instances of app 118 share the same URL, such as www.example.com, but the IP addresses of these app instances are different. When a client visits the URL, load distribution engine 108 resolves the domain name returns the IP address of one of the instances of app 118 so that the client's request is directed to that particular app instance. In some embodiments, load distribution engine 108 picks the app instance via a round-robin approach, which evenly distributes loads to all app instances. In some embodiments, load distribution engine 108 can also apply geographical load balancing, in which the selected app instance is the closest in distance to the originated IP address. For a non-limiting example, requests coming from Asia should be directed to app instances located in Asia while those from Europe should be piped to app instances resided in Europe.

(2) Load balancing. In some embodiments, load distribution engine 108 performs load balancing by distributing loads, e.g., client requests, to instances of app 118 running on PaaS instances in different cloud instances and hosts/computers. Here, load distribution engine 108 acts like a proxy, which accepts an incoming request from a client and forwards the request to one of the servers running the application instances. In some embodiments, load distribution engine 108 can distribute loads in a round robin fashion or based on other approaches such as location-based distribution. Load distribution engine 108 also offers other features like automatic failover.

(3) URL Redirection. In some embodiments, multiple instances of app 118 may have different URLs, such as www1.example.com and www2.example.com. Under this scenario, load distribution engine 108 can be set up to take in all of the incoming requests from the clients. Instead of acting like a proxy as under load balancing, load distribution engine 108 redirects a request from a client to one of the app instances based on its distinct URL. Load distribution engine 108 will always redirect subsequent requests from the same client to the same app instance. URL redirection removes the bottleneck of load balancing and does not have the propagation delay of DNS rotation.

Figure 2:
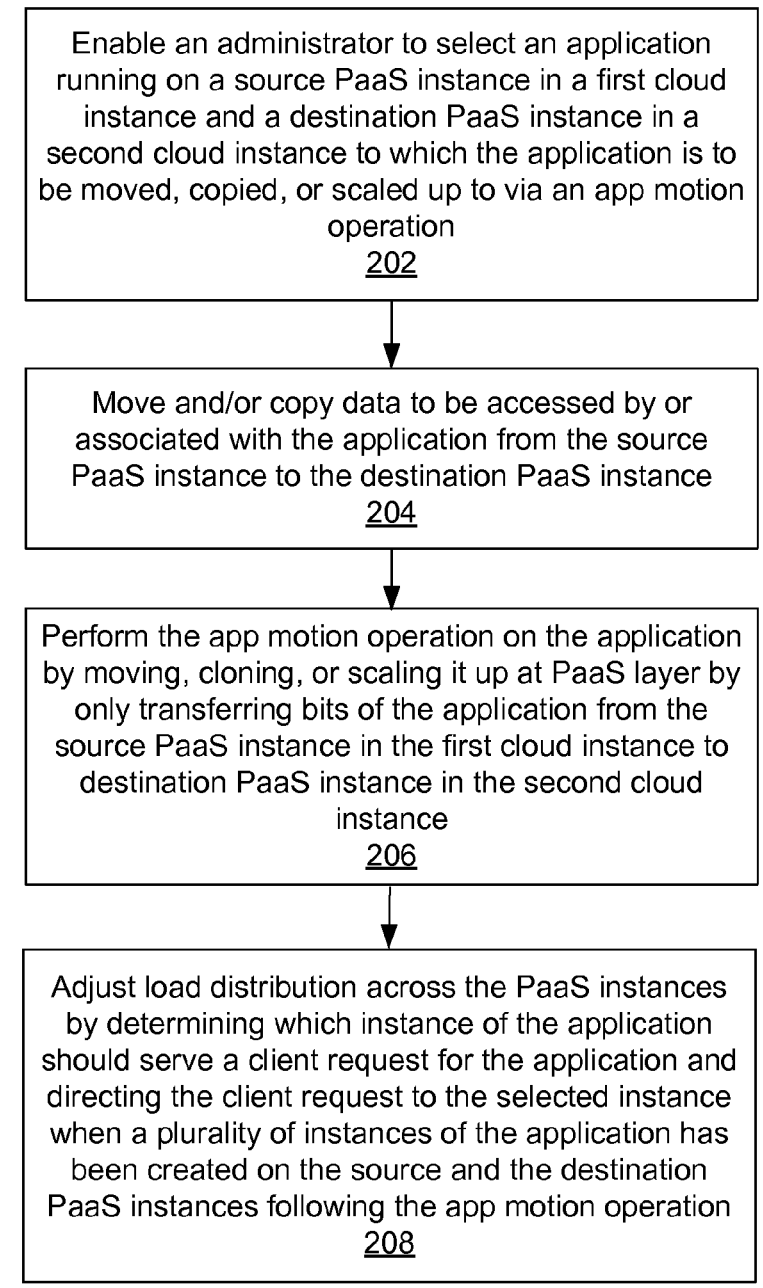
FIG. 2 depicts a flowchart of an example of a process to support PaaS level app motion in the hybrid cloud.

FIG. 2 depicts a flowchart of an example of a process to support PaaS level app motion in a hybrid cloud. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where admin engine 102 enables an administrator to select an application running on a source PaaS instance in a first cloud instance and a destination PaaS instance in a second cloud instance to which the application is to be moved, copied, or scaled up to via an app motion operation. The flowchart 200 continues to block 204, where data engine 104 moves and/or copies data to be accessed by or associated with the application from the source PaaS instance to the destination PaaS instance. The flowchart 200 continues to block 206, where federation engine 106 performs the app motion operation on the application by moving, cloning, or scaling it up at PaaS layer by only transferring bits of the application from the source PaaS instance in the first cloud instance to destination PaaS instance in the second cloud instance. The flowchart 200 ends at block 208 where load distribution engine 108 adjusts load distribution across the PaaS instances by determining which instance of the application should serve a client request for the application and directing the client request to the selected instance when a plurality of instances of the application has been created on the source and the destination PaaS instances following the app motion operation.

Figure 3:
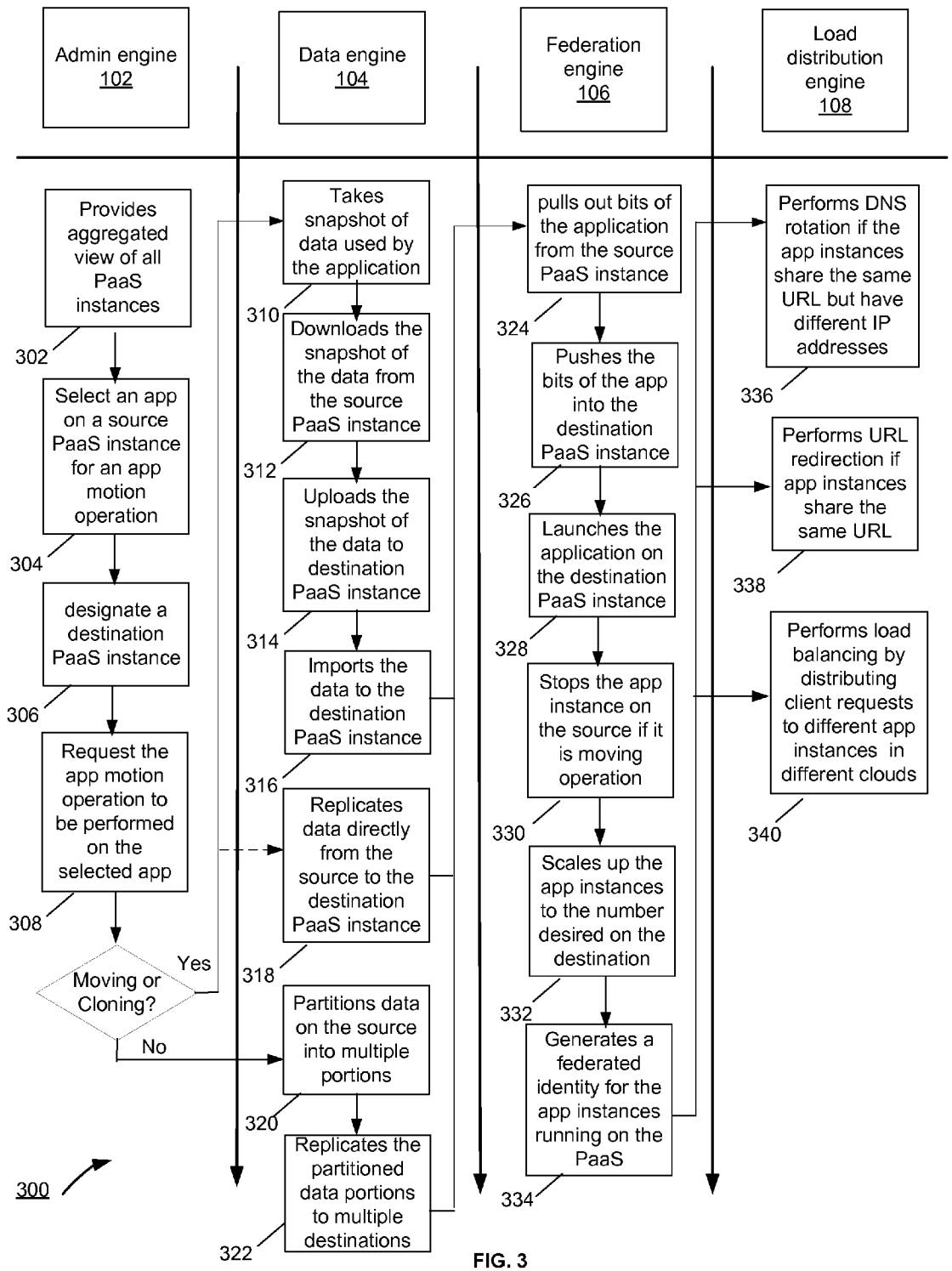
FIG. 3 is a swimlane diagram of an exemplary method for performing an app motion operation on an application at PaaS level.

FIG. 3 is a swimlane diagram 300 of an exemplary method for performing an app motion operation on an application at the PaaS level. This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

In operation 302, admin engine 102 provides an aggregated view of all PaaS instances to a system administrator through a single or multiple panes of user interface. Admin engine 102 then enables an administrator to select an application running on a source PaaS instance for an app motion operation in operation 304. Admin engine 102 also enables the administrator to designate a destination PaaS instance in operation 306, to which the application is to be moved, copied, or scaled up during app motion operation. Once the application, the source PaaS instance, and the destination PaaS instance are selected, admin engine 102 enables the administrator to request the app motion operation to be performed on the selected application in operation 308.

If the app motion operation involves a cloning or moving operation (as requested by a user) of the application and if movement of data accessed or associated with the application is needed, data engine 104 will perform the following operations before federation engine 106 starts the actual app motion operations on the application. First, data engine 104 invokes application management API of the source PaaS instance to take a snapshot of the data accessed by or associated with the application in operation 310. Next, data engine 104 retrieves/exports/downloads the snapshot of the data from a database of the source PaaS instance and saves the data as a temporary file in the local file system of the source PaaS instance in operation 312. Here, each (source or destination) PaaS instance has a database that provides data services with APIs for importing to and exporting data from the PaaS instance. Once the snapshot of the data is exported, data engine 104 then uploads the snapshot of the data to the destination PaaS instance in operation 314 and stores the imported data as a temporary file in the destination PaaS instance. Finally, data engine 104 invokes data importing API of the destination PaaS instance to import the temporary file to an internal database of the destination PaaS instance in operation 316, which completes data moving operation from the source PaaS instance to the destination PaaS instance. As used herein, the term database is used broadly to include any known or convenient means for storing and managing data, either centralized, distributed, relational or otherwise. For non-limiting examples, such database can be but is not limited to MYSQL, Hadoop or Key-Value stores.

As an alternative to operations 310-316, data engine 104 may replicate data directly from the source PaaS instance to the destination PaaS instance at different hardware and/or software layers of the hosts/computer systems on which the PaaS instances are running using various aforementioned techniques in operation 318. For a non-limiting example, the hardware layers may be disk arrays that provide remote replication functions/service, and the software layers may be one of a hypervisor (such as vSphere) that can replicate the image of a database of a VM (including the data) to a remote hypervisor, an operating system that can perform remote file synchronization, and a database that offers certain replication mechanisms between the two PaaS instances. In some embodiments, data engine 104 may replicate data between the PaaS instances either synchronously or asynchronously. For a non-limiting example, if data engine 104 performs the data replication at the hardware layer between two storage devices, a data link can be set up between the storage devices with either a fiber channel for synchronous transmission or an Ethernet cable for asynchronous transmission via the built-in hardware capabilities of the storage devices. The hypervisor, operating system, and database also offer similar mechanisms for synchronous or asynchronous replication. As such, operation 318 becomes a cloud-to-cloud data replication and the data engine 104 serves as a coordinator of the replication operation. This is more sophisticated data operation than the extract-and-import approach of operations 310-316 and it reduces the down time of the application to minimum. Depending on the data being replicated, a data plug-in may be required to synchronize data to between the source and the destination PaaS instances.

If the app motion operation involves a scaling up operation of the application to multiple PaaS instances in a hybrid cloud, data engine 104 may first partition the database on the source PaaS instance into multiple portions in operation 320. Data engine 104 then replicates the partitioned data portions to the multiple destination PaaS instances in operation 322 wherein each of the PaaS instance may have its own portion of data to be read and written by its own application instances. Such an approach takes advantage of the massive scalability of the hybrid cloud and can achieve high scalability because the computers hosting the PaaS instances do not share data with each other.

Once the data accessed by or associated with the application has been copied from the source PaaS instance to the destination PaaS instance, federation engine 106 starts to perform the app motion operation on the application in the following steps. In some embodiments, each (source or destination) PaaS instance provides data services with APIs for importing to and exporting bits of the application from the PaaS instance. First, federation engine 106 invokes application management API of the source PaaS instance to retrieve (or download) bits of the application and save them to a temporary file in the local file system of the source PaaS instance in operation 324. For a non-limiting example, Cloud Foundry v.1 provides an API of "get 'apps/:name/instances/:instance_id/files" for the downloading of the bits of the app. Next, federation engine 106 pushes (or uploads) the bits of the app into the destination PaaS instance as an app instance and invokes the API of the destination PaaS instance to form a binding between the app instance and its earlier uploaded data in operation 326. For a non-limiting example, Cloud Foundry v.1 provides an API of "put apps/:name/application" for the uploading of the bits of the app and an API of "post services/v1/bindings" as well as other relevant APIs for the binding between the app instance and its uploaded data. Federation engine 106 then sets the configuration of the cloned or copied application instance and launches the application on the destination PaaS instance in operation 328. If it is a moving operation of the application, federation engine 106 also stops the instance of the application running on the source PaaS instance in operation 330. If it is a scaling up operation of the application, federation engine 106 scales up the instances of the application to the number desired on the destination PaaS instance in operation 332. Finally, federation engine 106 generates a federated identity for the instances of the application running on the source and the destination PaaS instances in operation 334.

Once the app motion operation on the application is completed, if multiple instances of the application have been created, load distribution engine 108 performs one or more of the following operations: 1) DNS rotation in operation 336 if the multiple instances of the applications share the same URL but have different IP addresses; 2) URL redirection in operation 338 if the multiple instances of the applications share the same URL; and 3) load balancing by distributing client requests to different application instances running on the PaaS instances in different cloud instances in operation 340.

Use Case: Scaling Out

In one non-limiting example of a use case of system 100, an enterprise has established an on-premise PaaS instance (e.g., Cloud Foundry), which has application instances running on it. When this PaaS instance has reached its full computing capacity, the enterprise can extend the PaaS platform to include other PaaS instances at other datacenters. Here, the target can be at a datacenter which provides dedicated hosting services of a destination PaaS instance to this enterprise. A secure network connection (i.e. VPN) is set up between the two datacenters, system 100 federates the two PaaS instances and allows instances of the application to be moved, cloned or scaled up across the two PaaS instances. This is known as the Virtual Private Cloud (VPC) model. If the destination PaaS instance is hosted by a public IaaS provider, such as one of VMWare's vCloud Service Providers, this then becomes a hybrid cloud model. For both the VPC model and the hybrid cloud model, system 100 helps the enterprise to move or scale its applications at will to achieve high agility in response to business need.

Use Case: Geographical Load Distribution

In another non-limiting example of a use case of system 100, an enterprise has two PaaS instances that are located on the east and west coast of the United States, respectively. System 100 can facilitate the application management of both PaaS instances and distribute workloads to each instance based on the geographic locations of the clients requesting for service via a DNS rotation approach as described above. Such geographical-based load distribution greatly reduces the response time and improves the user experience of the application.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
a processing device comprising a processor for executing instructions stored on a memory to perform a method comprising:
selecting an application running on a source PaaS instance running in a first cloud instance and a destination PaaS instance running in a second cloud instance;
moving or copying data associated with the application from the source PaaS instance to the destination PaaS instance;
retrieving bits of the application from the source PaaS instance;
transmitting the retrieved bits of the application to the destination PaaS instance without moving or copying at least some data required for running the application on the destination PaaS instance; and
binding the bits of the application and the data associated with the application to the destination PaaS instance.

2. The system of claim 1, wherein:
the source PaaS instance and the destination PaaS instance are heterogeneous.

3. The system of claim 1, wherein:
the processing device is further programmed with executable instructions that, when executed, perform the method of adjusting load distribution across the PaaS instances by determining which instance of the application should serve a client request for the application and directing the client request to the selected instance when a plurality of instances of the application has been created on the source and the destination PaaS instances following the app motion operation.

4. The system of claim 1, wherein:
the processing device is further programmed with executable instructions that, when executed, perform the method of providing an aggregated view of the PaaS instances to the administrator through a single or multiple panes of user interface (UI).

5. The system of claim 1, wherein:
the processing device is further programmed with executable instructions that, when executed, perform the method of moving or copying the data at the hardware or software level of hosts on which the source PaaS instance and the destination PaaS instance are running.

6. The system of claim 1, wherein:
the processing device is further programmed with executable instructions that, when executed, perform the method of performing the app motion operation on the application at the PaaS layer without moving or copying one or more of virtual machines, operating system, middleware, runtimes and services required for running the application on the PaaS instances.

7. The system of claim 1, wherein:
the processing device is further programmed with executable instructions that, when executed, perform the method of creating and managing a virtual federated identity of an owner of the application, wherein the federated identity enables the owner to move the application between the source and destination PaaS instances.

8. The system of claim 1, wherein:
the processing device is further programmed with executable instructions that, when executed, perform the method of adjusting load distribution across the PaaS instances by performing one or more of: DNS rotation, URL redirection, and load balancing on the plurality of instances of the application.

9. A method, comprising:
selecting an application running on a source PaaS instance running in a first cloud instance and a destination PaaS instance running in a second cloud instance;
moving or copying data associated with the application from the source PaaS instance to the destination PaaS instance;
retrieving bits of the application from the source PaaS instance;
transmitting the retrieved bits of the application to the destination PaaS instance without moving or copying at least some data required for running the application on the destination PaaS instance; and
binding the bits of the application and the data associated with the application to the destination PaaS instance.

10. The method of claim 9, further comprising:
adjusting load distribution across the PaaS instances by determining which instance of the application should serve a client request for the application and directing the client request to the selected instance when a plurality of instances of the application has been created on the source and the destination PaaS instances following the app motion operation.

11. The method of claim 9, further comprising:
providing an aggregated view of the PaaS instances to the administrator through a single or multiple panes of user interface (UI).

12. The method of claim 9, further comprising:
moving or copying the data at the hardware or software level of hosts on which the source PaaS instance and the destination PaaS instance are running.

13. The method of claim 9, further comprising:
performing the app motion operation on the application at the PaaS layer without moving or copying one or more of virtual machines, operating system, middleware, runtimes and services required for running the application on the PaaS instances.

14. The method of claim 9, further comprising:
creating and managing a virtual federated identity of an owner of the application, wherein the federated identity enables the owner to move the application between the source and destination PaaS instances.

15. The method of claim 9, further comprising
adjusting the load distribution across the PaaS instances by performing one or more of: DNS rotation, URL redirection, and load balancing on the plurality of instances of the application.

16. At least one non-transitory computer-readable storage medium having computer-executable instructions embodied thereon, wherein, when executed by at least one processor, the computer-executable instructions cause the at least one processor to:
select an application running on a source PaaS instance running in a first cloud instance and a destination PaaS instance running in a second cloud instance;
move or copy data associated with the application from the source PaaS instance to the destination PaaS instance; retrieve bits of the application from the source PaaS instance;
transmit the retrieved bits of the application to the destination PaaS instance without moving or copying at least some data required for running the application on the destination PaaS instance; and
bind the bits of the application and the data associated with the application to the destination PaaS instance.

17. The at least one non-transitory computer-readable storage medium of claim 16, wherein the computer-executable instructions further cause the at least one processor to adjust load distribution across the PaaS instances by determining which instance of the application should serve a client request for the application and directing the client request to the selected instance when a plurality of instances of the application has been created on the source and the destination PaaS instances following the app motion operation.

18. The at least one non-transitory computer-readable storage medium of claim 16, wherein the computer-executable instructions further cause the at least one processor to provide an aggregated view of the PaaS instances to the administrator through a single or multiple panes of user interface (UI).

19. The at least one non-transitory computer-readable storage medium of claim 16, wherein the computer-executable instructions further cause the at least one processor to move or copy the data at the hardware or software level of hosts on which the source PaaS instance and the destination PaaS instance are running.

20. The at least one non-transitory computer-readable storage medium of claim 16, wherein the computer-executable instructions further cause the at least one processor to perform the app motion operation on the application at the PaaS layer without moving or copying one or more of virtual machines, operating system, middleware, runtimes and services required for running the application on the PaaS instances.

21. The at least one non-transitory computer-readable storage medium of claim 16, wherein the computer-executable instructions further cause the at least one processor to create and manage a virtual federated identity of an owner of the application, wherein the federated identity enables the owner to move the application between the source and destination PaaS instances.

22. The at least one non-transitory computer-readable storage medium if claim 16, wherein the computer-executable instructions cause the at least one processor to adjust the load distribution across the PaaS instances by performing one or more of: DNS rotation, URL redirection, and load balancing on the plurality of instances of the application.

* * * * *